United States Patent
Annic

(10) Patent No.: US 7,822,861 B2
(45) Date of Patent: Oct. 26, 2010

(54) SYSTEM AND METHOD FOR SELECTION OF A COMMUNICATION NETWORK BY A TERMINAL

(75) Inventor: Etienne Annic, Rambouillet (FR)

(73) Assignee: Orange France, Montrouge (FR)

( * ) Notice: Subject to any disclaimer, the term of this patent is extended or adjusted under 35 U.S.C. 154(b) by 834 days.

(21) Appl. No.: 10/537,236

(22) PCT Filed: Nov. 19, 2003

(86) PCT No.: PCT/FR03/03430

§ 371 (c)(1),
(2), (4) Date: Jan. 19, 2006

(87) PCT Pub. No.: WO2004/052032

PCT Pub. Date: Jun. 17, 2004

(65) Prior Publication Data

US 2006/0155829 A1   Jul. 13, 2006

(30) Foreign Application Priority Data

Nov. 29, 2002 (FR) .................................. 02 15101

(51) Int. Cl.
*G06F 15/16* (2006.01)
(52) U.S. Cl. ...................... 709/228; 709/225
(58) Field of Classification Search .................. 709/227, 709/228, 229, 230, 238
See application file for complete search history.

(56) References Cited

U.S. PATENT DOCUMENTS

2002/0006780 A1   1/2002   Ibanez et al.

FOREIGN PATENT DOCUMENTS

| WO | WO 00/67435 A | 11/2000 |
| WO | WO 01/28160 A | 4/2001 |
| WO | WO 02/01822 A | 1/2002 |
| WO | WO 02/09451 A | 1/2002 |
| WO | WO 02/30056 A | 4/2002 |
| WO | WO 03/107601 A | 12/2003 |

OTHER PUBLICATIONS

M. Bilgic et al., "Quality of service in general packet radio service", Mobile Multimedia Communications, 1999 IEEE International Workshop in San Diego, CA, pp. 226-231, Nov. 15, 1999.

*Primary Examiner*—William C Vaughn, Jr.
*Assistant Examiner*—Scott Christensen
(74) *Attorney, Agent, or Firm*—Cohen Pontani Lieberman & Pavane LLP

(57) ABSTRACT

System for selecting an architecture (15, 16, 17) dedicated to a communications network (40, 41, 42, 50, 51, 52) in a terminal (10) including a user interface (11). The connection to the communications network (40, 41, 42, 50, 51, 52) is set up by means of a PDP context link via a mobile network. The system controls access to a dedicated architecture manager (19) integrated into the terminal (10) to manage an architecture (15, 16, 17) dedicated to a communications network (40, 41, 42, 50, 51, 52) and to process simultaneously the operation of the dedicated architectures (15, 16, 17) of the terminal (10) connected to a plurality of the communications networks (40, 41, 42, 50, 51, 52). The system can be used for selecting access to a communications network (40, 41, 42, 50, 51, 52) of a set of communications networks each offering a set of services via a dedicated architecture (15, 16, 17) integrated into the terminal (10) which is connected to a public mobile network to which the user is a subscriber.

23 Claims, 1 Drawing Sheet

SYSTEM AND METHOD FOR SELECTION OF A COMMUNICATION NETWORK BY A TERMINAL

RELATED APPLICATIONS

This is a U.S. National Phase Application under 35 USC 371 of International Application PCT/FR2003/003430, filed on 19 Nov. 2003.

FIELD OF THE INVENTION

The present invention relates to a system and to a method for selecting in a terminal an architecture that is dedicated to a communications network.

The invention applies more particularly to using a dedicated architecture integrated in a terminal connected to a public mobile network to which the user is a subscriber, for accessing a communications network from a set of communications networks, each offering a set of services.

BACKGROUND OF THE INVENTION

At present, such services are accessible from a terminal connected to mobile telecommunications networks such as GPRS (General Packet Radio Service) networks and UMTS (Universal Mobile Telecommunication System) networks.

In these mobile networks, to select a communications network offering services, it is necessary to select a name identifying the communications network. To set up a connection between a terminal and a particular communications network, the identifying name is transmitted via a service support equipment of the mobile network to an equipment managing access to the communications networks. The identifying name specified by the terminal enables the service support equipment of the mobile network to determine the access management equipment associated with the identifying name that offers access to the specified communications network.

In existing GPRS and UMTS networks, the name identifying a communications network is called its access point name (APN), the service support equipment is called the serving GPRS support node (SGSN), and the equipment managing access to the various communications networks is called the gateway GPRS service node (GGSN).

An APN primarily comprises an identifier that corresponds to the selected communications network, an identifier of the operator managing the communications network, and an identifier of the technology of the mobile network, for example the GPRS technology. The format and use of an APN are covered by standards issued by the ETSI (European Telecommunications Standards Institute).

One function of an SGSN is to receive an APN from a terminal and to send it to an APN server to which it is connected in order for the APN to be recognized. The APN server responds to the SGSN by sending a list of the GGSN associated with the specified APN. One function of the SGSN is to set up a connection to a GGSN from the list. The GGSN sets up a connection to a communications network that corresponds to the APN. The SGSN and the GGSN are also covered by ETSI standards.

To access a communications network offering a set of services, the user selects an APN on the terminal in order to set up a connection with the corresponding communications network.

Once an APN has been selected on the terminal, an access protocol is initialized. In a GPRS or UMTS network, this protocol is the packet data protocol (PDP). A procedure is executed to set up a connection from the terminal to the GGSN. To enable the connection to be set up, a link across the mobile network to the selected communications network is created. In a GPRS or UMTS network, that link is called a PDP context. It enables the terminal to access the services of the communications network.

At the end of the set-up procedure, the terminal receives from the communications network to which a connection has been set up an address that identifies the terminal within the communications network and is associated with the PDP context linking the terminal and the communications network.

The ETSI standard provides for a plurality of connections to be set up simultaneously from the same terminal to different communications networks. The document FR 02 07457 describes the use of a dedicated architecture manager in a terminal to manage simultaneous access to a plurality of communications networks.

In that document, on establishing a connection to a communications network, the dedicated architecture manager dialogues with the communications network. In the terminal, the dedicated architecture manager designates an architecture dedicated to the connection to the connected communications network. On setting up each new connection to a new communications network, the dedicated architecture manager designates a different architecture dedicated to the connection to the new communications network. The various dedicated architectures in the same terminal operate simultaneously. Each dedicated architecture is associated with a PDP context and provides access to a different communications network.

The above document mentions that each dedicated architecture comprises a network interface. Each communications network communicates with a dedicated architecture of the terminal via a separate network interface. The address sent by each of the communications networks is received by the dedicated architecture manager and its parameters are set via a network interface. A network interface of any dedicated architecture is unrelated to any other network interface of any other dedicated architecture.

The dedicated architecture manager in a terminal assigns each dedicated architecture to a communications network. The autonomy and independent operation of the dedicated architecture of the terminal guarantee confidentiality and security between communications networks by providing a "seal" between the various services connected to the terminal.

To maintain the independence of the various communications networks effectively, a dedicated architecture has no functions for managing the associated PDP context created via the mobile network to enable access from the terminal to a communications network.

Moreover, because of the autonomy of the various dedicated architectures of a terminal, each dedicated architecture has no view of the operation of the other dedicated architectures of the terminal.

The document WO 02/30056 describes a system for managing quality of service after a mobile terminal has accessed a private network. The mobile terminal accesses various applications via a gateway and via this one private network. The base station associated with the mobile terminal identifies the appropriate quality of service for each of the applications corresponding to the various IP (Internet Protocol) data packets sent over the private network. The above document does not describe selection for the purposes of access in the terminal to a set of communications networks and management thereof.

The document WO 02/01822 describes a method of securing remote access to a private data transmission network in an IP (Internet Protocol) environment using the functions of a remote access server with GPRS functions. Procedures for managing a PDP context are defined in ETSI and 3GPP standards and provide GPRS connectivity (remote access and security) and for use of the radio resources of the GPRS network. The above document does not explain how remote access with a plurality of networks is selected and managed in a terminal.

The document WO 02/09451 concerns a method of connecting a plurality of terminal equipments TE via a mobile terminal MT to a single packet data network PDN. As the mobile terminal MT receives the IP addresses assigned to each terminal equipment TE from only one data network PDN, the addresses are always different from each other. Consequently, the cited document does not encounter the problem addressed by the invention, i.e. that of selecting on a terminal the functioning of a plurality of architectures each dedicated to a different communications network.

SUMMARY OF THE INVENTION

One object of the present invention is to provide a system and method for making a selection from a set of architectures dedicated to communications networks in a terminal that includes a user interface and is adapted to be connected simultaneously to a plurality of said communications networks.

This and other objects are attained in accordance with one aspect of the present invention directed to a system for making a selection from a set of architectures dedicated to communications networks in a terminal that includes a user interface and is adapted to be connected simultaneously to a plurality of the communications networks. In this system, the connections to the communications networks are set up via a mobile network by means of PDP context links to the communications networks. The system includes selection means integrated into the user interface of the terminal for selecting the APN of one of the communications networks, for controlling access to a dedicated architecture manager integrated into the terminal for managing the architecture dedicated to the selected communications network, and for connecting the dedicated architecture manager to the PDP context link to the selected communications network in order to process a state of the link and to adapt a resource to the selected communications network.

In accordance with an embodiment of the invention the connections to the communications networks being set up via a mobile network by means of PDP context links to said communications networks, the system comprising selection means integrated into the user interface of the terminal for selecting the APN of one of the communications networks, for controlling access to a dedicated architecture manager integrated into the terminal for managing the architecture dedicated to the selected communications network, and for connecting the dedicated architecture manager to the PDP context link to the selected communications network in order to process a state of said link and to adapt a resource to the selected communications network.

The dedicated architecture manager of the terminal manages simultaneous operation of the various architectures dedicated to the various communications networks to which the terminal is connected.

The selection means provide access to the dedicated architecture manager, which controls one of the dedicated architectures that it manages as a function of what the user has selected.

In this way, each of the dedicated architectures of the terminal communicates with only one communications network, which is associated with the corresponding PDP context, even if the terminal is connected to a plurality of communications networks.

The separate and autonomous operation of the various dedicated architectures of the terminal is therefore preserved, which guarantees confidentiality and security between the various communications networks to which the terminal is connected. These imperatives are particularly important during a banking transaction or on connecting to a business private network, for example.

According to an embodiment of the invention, the selection means are integrated into the user interface of the terminal.

Access to the services corresponding to a communications network is provided by the user interface of the terminal, for example display means, sound or voice means, or Braille means.

The user of the terminal activates the selection means to control the dedicated architecture manager.

The selection means are of any form and any kind adapted to the existing technologies of the user interface of the terminal, such as buttons on a keypad of the terminal, pull-down menus, voice commands, Braille commands, hypertext links on a screen of the terminal, or any other selection device.

According to an embodiment of the invention, the selection means are associated with a control device for the selection means.

The selection means of the terminal may be activated by control devices such as temperature sensors, pressure sensors or any other control means.

Another object of the present invention is directed to a method of making a selection in a terminal from a set of architectures dedicated to communications networks, such terminal including a user interface and being adapted to be connected simultaneously to a plurality of the communications networks. In this method, the connections to the communications networks are set up via a mobile network by means of PDP context links to the communications networks. The method includes the steps of integrating selection means with the user interface of the terminal; activating the selection means of the terminal to select an APN of one of the communications network; the selection means controlling access to a dedicated architecture manager integrated into the terminal to manage a state of a dedicated architecture; the dedicated architecture manager controlling first means of transmission to the dedicated architecture of the terminal; the dedicated architecture manager controlling second means of transmission to the selected communications network; the dedicated architecture manager processing a state of the PDP context link to the selected communications network; and the dedicated architecture manager accessing a resource of the terminal accessible by the dedicated architecture and adapted to the selected communications network.

In one embodiment of the invention, the dedicated architecture manager assigns a dedicated architecture to each of the communications networks, offering the possibility of simultaneous but different and independent management.

The selection means are used to activate the dedicated architecture manager of the terminal, which then controls access and also controls the functions of each of the dedicated architectures (by means of first transmission means), each of the communications networks (by means of second transmission means), each of the corresponding PDP contexts, and each of the resources of the terminal.

When activated, and according to what the user has selected, the dedicated architecture manager manages one of the dedicated architectures, one of the communications networks, one of the PDP contexts corresponding to the communications network, or one of the resources of the terminal.

Because the dedicated architectures operate separately and autonomously, the operation of the terminal may be adapted according to the communications network to which it is connected. For example, there may be functions on one of the communications networks that not exist on another communications network.

Moreover, because of the increased number of services accessible via communications networks, the autonomy of each dedicated architecture in particular allows assignment of specific resources, for example specific applications or a specific memory space or a specific quality of service that differ from one communications network to another.

DETAILED DESCRIPTION OF THE DRAWING

Figure 1:
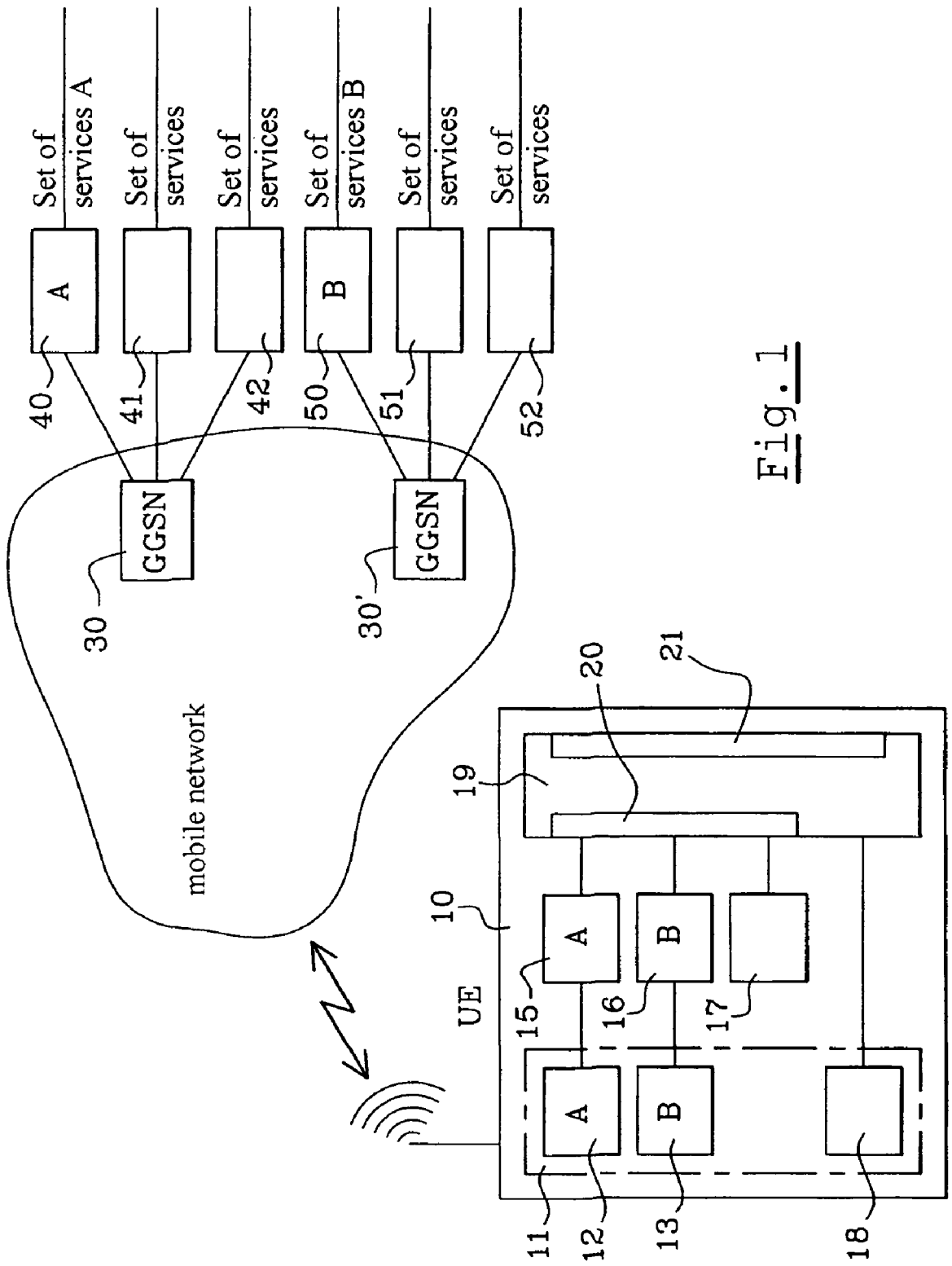
FIG. 1 is a diagram of the general architecture of a system according to the invention for selecting in a terminal an architecture dedicated to a communications network.

To facilitate the explanation of the invention, it is described using the terminology of the UMTS. However, the invention applies to all communications systems using identical communications network identification techniques.

Similarly, to simplify the description, the mobile telecommunications network subscriber is indicated by a terminal 10 in the form of a user equipment (UE) in FIG. 1, but may be of different kinds, for example a server, a mobile communications terminal, a personal computer (PC) or a television.

Whichever kind of terminal 10 is used, it is connected to a public mobile network to which the user is a subscriber.

At present, if the user of the terminal 10 wishes to access a communications network 40, 41, 42, 50, 51, 52 offering a set of services to which the user requires access, the user uses a radio station of the mobile network to send an APN identifying the communications network 40, 41, 42, 50, 51, 52.

To this end the user accesses, for example via the user interface 11, a list in the dedicated architecture manager 19 of APN identifying the communications networks 40, 41, 42, 50, 51, 52 to which the user is a subscriber and which the user can access. The ETSI standard provides for a plurality of connections to be set up simultaneously to different communications networks from the same terminal and, among other things, the list of APN enables the terminal to operate as a so-called "multi-APN" terminal.

A radio access management equipment SGSN in the mobile network receives the APN from the terminal 10 and determines which access management equipment GGSN manages the APN.

The SGSN sends the APN to an APN server to which it is connected and which holds a table of the correspondences between APN and GGSN. The SGSN selects a GGSN 30, 30' which manages that APN.

The GGSN 30, 30' sets up a connection to the communications network 40, 41, 42, 50, 51, 52. A PDP context link to the communications network 40, 41, 42, 50, 51, 52 is set up across the mobile network and enables the terminal 10 to access the communications network 40, 41, 42, 50, 51, 52.

The GGSN 30, 30' then sends the terminal 10 an address that identifies the terminal 10 in the communications network 40, 41, 42, 50, 51, 52 to which it has been connected.

The dedicated architecture manager 19 in the terminal 10 receives the address, assigns a dedicated architecture 15, 16, 17 to the connected communications network 40, 41, 42, 50, 51, 52, and sends the address to the dedicated architecture 15, 16, 17 that has been assigned to the communications network 40, 41, 42, 50, 51, 52.

The dedicated architecture 15, 16, 17 is associated with the PDP context that enables access from the terminal 10 to the communications network 40, 41, 42, 50, 51, 52.

The connection steps referred to above are repeated each time the user of the terminal 10 wishes to access a new communications network 40, 41, 42, 50, 51, 52.

A new connection is then set up between the terminal 10 and a new communications network 40, 41, 42, 50, 51, 52. Consequently, a new PDP context link to the new communications network 40, 41, 42, 50, 51, 52 is set up across the mobile network.

The dedicated architecture manager 19 in the terminal 10 receives a new address and assigns a new dedicated architecture 15, 16, 17 to the connected new communications network 40, 41, 42, 50, 51, 52. From this point onwards, the new dedicated architecture 15, 16, 17 is associated with the new PDP context enabling access from the terminal 10 to the new communications network 40, 41, 42, 50, 51, 52.

When each connection is set up, and each time that a communications network 40, 41, 42, 50, 51, 52 is assigned a dedicated architecture 15, 16, 17, the dedicated architecture manager 19 stores the identifier of the dedicated architecture 15, 16, 17 used in the terminal 10 in a list of dedicated architectures 15, 16, 17 managed by the dedicated architecture manager 19 of the terminal 10. The ETSI standard provides for a plurality of connections to be set up simultaneously to different communications networks from the same terminal and, among other things, the list of dedicated architectures enables the terminal to operate as a so-called "multi-APN" terminal.

Once the connection has been set up, the dedicated architecture accesses the user interface 11 of the terminal 10. In this way, the subscriber can access a service content of the communications network 40, 41, 42, 50, 51, 52, for example a home page 12, 13.

If display of the content on the terminal 10 is not required by the communications network, the content of the communications network can be represented by any other means of the user interface 11 of the terminal 10, such as a voice message reproduced by audio means.

The user interface 11 of the terminal 10, for example comprising display means, audio means, voice means or Braille means, provides access to the services corresponding to the various communications networks 40, 41, 42, 50, 51, 52.

Regardless of the number of connections set up, each architecture 15, 16, 17 dedicated to a communications network 40, 41, 42, 50, 51, 52 receives information from the communications network 40, 41, 42, 50, 51, 52 via each PDP context link corresponding to the communications network 40, 41, 42, 50, 51, 52.

To enable it to manage the various connections, the terminal 10 is equipped with selection means 18 integrated into the user interface 11.

The selection means 18 are of any form and any kind adapted to the existing technologies of the user interface 11 of the terminal 10, and may comprise buttons on keypads of the terminal, pull-down menus on display means, hypertext links on the display means and selected by a cursor, for example by a mouse, by touching a touch-sensitive screen or by directing the user's gaze, voice commands spoken by the subscriber of the terminal, Braille commands, or any other selection means.

The user of the terminal 10 activates the selection means 18 of the terminal 10.

The selection means 18 may equally be associated with a control device of the selection means 18. In this case, the control device activates the selection means 18 of the terminal 10.

For example, the control device is a temperature or pressure sensor, an induction sensor or any other sensing or measuring device enabling activation of the selection means 18, for example as a function of the value of a temperature or pressure measured by the control device threshold or a temperature or pressure threshold.

The selection means 18 are either general or specific to a management function of the dedicated architecture manager 19.

If the selection means 18 are general, they provide access to a choice of the various management functions of the dedicated architecture manager 19, for example by means of a text or voice menu listing the management functions.

Otherwise, the terminal 10 may include a plurality of specific selection means each corresponding to one of the management functions of the dedicated architecture manager 19.

The tasks of the dedicated architecture manager 19 include managing the management functions, in particular functions for creating, modifying, suspending and closing a dedicated architecture 15, 16, 17, or any other management function useful for a dedicated architecture 15, 16, 17 or for consultation of characteristic data of a dedicated architecture 15, 16, 17, for example the resources used in the terminal 10.

The management function of the dedicated architecture manager 19 is activated by the selection means 18 or by the selection that has been made, for example with the aid of a list of the management functions of the dedicated architecture manager 19.

The dedicated architecture manager 19 controls first means 20 of transmission to an architecture 15, 16, 17 dedicated to a communications network 40, 41, 42, 50, 51, 52 according to how activation was effected. The first transmission means 20 are integrated into the dedicated architecture manager 19.

The dedicated architecture manager 19 commands creation, modification, suspension or closure of transmission to the architecture 15, 16, 17 dedicated to a communications network 40, 41, 42, 50, 51, 52, for example, according to the management function selected.

The dedicated architecture manager 19 controls second means 21 of transmission to a communications network 40, 41, 42, 50, 51, 52 according to how activation was effected. The second transmission means 21 are also integrated into the dedicated architecture manager 19.

The dedicated architecture manager 19 controls creation, modification, suspension or closure of transmission to the communications network 40, 41, 42, 50, 51, 52, for example, according to the management function selected.

The dedicated architecture manager 19 manages the state of a PDP context link to the communications network 40, 41, 42, 50, 51, 52 according to how activation was effected.

The dedicated architecture manager 19 controls creation, modification, suspension or closure of the PDP context link between the terminal 10 and the communications network 40, 41, 42, 50, 51, 52 according to the management function selected, for example via the mobile network.

The dedicated architecture manager 19 allows access to a resource of the terminal 10 accessible by the architecture 15, 16, 17 dedicated to a communications network 40, 41, 42, 50, 51, 52 according to the type of activation effected.

The dedicated architecture manager 19 controls a memory location of the terminal 10, for example, or access to a function of the central processing unit (CPU) of the terminal 10 according to the management function selected, for the purposes of the architecture 15, 16, 17 dedicated to a communications network 40, 41, 42, 50, 51, 52.

Consequently, according to which of the management functions has been activated, the dedicated architecture manager 19 controls the first means 20 of transmission to an architecture 15, 16, 17 dedicated to a communications network 40, 41, 42, 50, 51, 52, the second transmission means 21 to a communications network 40, 41, 42, 50, 51, 52, the PDP context linking the terminal 10 and the communications network 40, 41, 42, 50, 51, 52 or the resource of the terminal 10.

According to what selection has been effected, the dedicated architecture manager manages one of the dedicated architectures, one of the communications networks, one of the PDP contexts corresponding to the communications network or one of the resources of the terminal, and all of the above in operation and in parallel with access by the terminal 10 to the services provided by the communications networks 40, 41, 42, 50, 51, 52.

In particular, if the user of the terminal 10 wishes to access a communications network 40, 41, 42, 50, 51, 52, the user accesses the list in the dedicated architecture manager 19 of APN identifying the communications networks 40, 41, 42, 50, 51, 52 to which the user is a subscriber and which the user can access.

After the user selects from the list an APN identifying one of the communications networks 40, 41, 42, 50, 51, 52 associated with a corresponding PDP context, the creation function of the dedicated architecture manager 19, by means of the first transmission means 20, assigns the selected APN a dedicated architecture 15, 16, 17 managed by the dedicated architecture manager 19 of the terminal 10.

The creation function of the dedicated architecture manager 19 uses the second transmission means 21 to control the standard ETSI (European Telecommunications Standards Institute) PDP context activation procedure, which leads to the provision of access to the communications network 40, 41, 42, 50, 51, 52 identified by the APN selected on the terminal 10.

The dedicated architecture manager 19 of the terminal 10 controls access to a resource of the terminal 10 used by the architecture 15, 16, 17 dedicated to the communications network 40, 41, 42, 50, 51, 52, such as access to a memory location of the terminal 10 or to a function of the central processor unit (CPU) of the terminal 10, for the purposes of the architecture 15, 16, 17 dedicated to the communications network 40, 41, 42, 50, 51, 52.

Similarly, once a connection has been set up between the terminal 10 and a communications network 40, 41, 42, 50, 51, 52, the modification function of the dedicated architecture manager 19 modifies the resources used in the terminal 10 by the architecture 15, 16, 17 dedicated to the connected communications network 40, 41, 42, 50, 51, 52 associated with the corresponding PDP context.

This modification allows adaptation of the resources of the terminal 10 to the communications network 40, 41, 42, 50, 51, 52, for example, on the occasion of a change of quality of service, by modifying the capacity of the memories assigned in the terminal 10.

By means of the first and second transmission means 20, 21, the modification function of the dedicated architecture manager 19 controls standard ETSI PDP content modification procedure, which includes modification of the characteristics of transmission to the connected communications network 40, 41, 42, 50, 51, 52.

In the exactly the same way, once a connection has been set up between the terminal 10 and a communications network 40, 41, 42, 50, 51, 52, the suspension function of the dedicated architecture manager 19 temporarily suspends transmission between the dedicated architecture manager 19 and the architecture 15, 16, 17 dedicated to the connected communications network 40, 41, 42, 50, 51, 52 associated with the corresponding PDP context.

Because of this, the dedicated architecture 15, 16, 17 can no longer access the connected communications network 40, 41, 42, 50, 51, 52 and can therefore no longer carry out any function, modification or intervention of any kind, such as assigning a memory resource of the terminal 10 or modifying the transmission quality of service.

By means of the first and second transmission means 20, 21, the suspension function of the dedicated architecture manager 19 controls the standard ETSI suspend procedure, which leads to temporary stopping of transmission to the connected communications network 40, 41, 42, 50, 51, 52.

Lifting a suspension leads to the resumption of normal transmission at the point and in the state at which transmission was suspended. In the dedicated architecture manager 19, the lifting of the suspension enables control of the standard ETSI resume procedure, which leads to the resumption of transmission to the connected communications network 40, 41, 42, 50, 51, 52.

In the same way, once a connection has been set up between the terminal 10 and a communications network 40, 41, 42, 50, 51, 52, the closure function of the dedicated architecture manager 19 closes down all transmission between the dedicated architecture manager 19 and the architecture 15, 16, 17 dedicated to the connected communications network 40, 41, 42, 50, 51, 52 associated with the corresponding PDP context.

By means of the first and second transmission means 20, 21, the closure function of the dedicated architecture manager 19 controls the standard ETSI PDP context deactivation procedure, which leads to the stopping of all transmission to the communications network 40, 41, 42, 50, 51, 52 connected to the terminal 10.

The dedicated architecture manager 19 of the terminal 10 controls the closure of the architecture 15, 16, 17 dedicated to the connected communications network, which releases all resources used in the terminal 10 by the dedicated architecture 15, 16, 17, for example all the memory locations of the terminal 10 or access to the central processor unit (CPU) of the terminal for the purposes of the dedicated architecture 15, 16, 17. Any files downloaded and stored in a non-volatile memory of the terminal 10 are not affected by the closure function and the releasing of the other resources of the terminal 10.

At the end of execution of the closure function, the identifier of the closed dedicated architecture 15, 16, 17 is deleted from the list of dedicated architectures 15, 16, 17 managed by the dedicated architecture manager 19 of the terminal 10.

The invention claimed is:

1. A terminal for providing simultaneous connections to multiple communications networks, wherein each connection is set up by a PDP context link, the terminal comprising:
   a plurality of resources, including at least one memory;
   a user interface;
   a selector integrated with the user interface, the selector being configured to receive a user selection of one of the communications networks and a user selection of a connection management function to be performed with respect to the selected communications network;
   dedicated architectures connected to the user interface, each of the dedicated architectures being configured for communication with at least one of the communications networks; and
   a dedicated architecture manager configured to provide simultaneous connections to more than one of the communications networks, the dedicated architecture manager being connected to the user interface and being connected between the dedicated architectures and a radio input/output of the terminal, wherein the dedicated architecture manager is configured to assign the dedicated architectures to respective ones of the communications networks, wherein the dedicated architecture manager stores a list of access point names, each access point name corresponding to one of each of the communications networks, and wherein the dedicated architecture manager connects via the PDP context link to each connected communications network to control a state of said link and to adapt at least one resource of the plurality of resources to the connected communications networks;
   wherein, based on the user selection made through the selector, the dedicated architecture manager communicates with a dedicated architecture assigned to the selected communications network, and communicates with the selected communications network, to perform the selected connection management function, and wherein said user selection of one of the communications networks is based on the list of access point names stored by the dedicated architecture manager.

2. The terminal of claim 1, wherein the dedicated architecture manager comprises a first transmission unit to provide individual communication with each of the dedicated architectures.

3. The terminal of claim 1, wherein the dedicated architecture manager comprises a second transmission unit to provide communication with multiple communications networks.

4. The terminal of claim 1, wherein the dedicated architecture manager comprises a network interface to provide communication with multiple communications networks.

5. The terminal of claim 1, wherein the dedicated architecture manager controls access by the dedicated architectures to said resources.

6. The terminal of claim 1, wherein the selected connection management function is a creation function that initiates transmission between the selected communications network and the terminal.

7. The terminal of claim 6, wherein the creation function comprises:
   activating a PDP context link to the selected communications network;
   receiving, from the selected communications network, an address that identifies the terminal in the selected communications network; and
   sending the address to the dedicated architecture assigned to the selected communications network.

8. The terminal of claim 1, wherein the selected connection management function is a modification function that modifies characteristics of transmission between the selected communications network and the terminal.

9. The terminal of claim 1, wherein the selected connection management function is a suspension function that suspends transmission between the selected communications network and the terminal.

10. The terminal of claim 1, wherein the selected connection management function is a closure function that ends transmission between the selected communications network and the terminal.

11. The terminal of claim 10, wherein the closure function comprises:
  deactivating a PDP context link to the selected communications network; and
  releasing resources of the terminal accessed by the dedicated architecture assigned to the selected communications network.

12. A method for providing simultaneous connections between a terminal and multiple communications networks, the terminal having a user interface with an integrated selector, dedicated architectures connected to the user interface, and a dedicated architecture manager, the method comprising:
  storing, by said dedicated architecture manager a list of access point names, each access point name corresponding to one of each of the communications networks;
  assigning at least one of the dedicated architectures to a respective one of the communications networks;
  receiving, through the selector, a user selection of one of the communications networks and a user selection of a connection management function to be performed with respect to the selected communications network, wherein said user selection of one of the communications networks is based on the list of access point names stored by the dedicated architecture manager; and
  performing the selected connection management function based on the user selection made with the selector, the performing of the selected connection management function comprising communicating between the dedicated architecture manager and a dedicated architecture assigned to the selected communications network, and communicating between the dedicated architecture manager and the selected communications network,
  wherein:
  the dedicated architecture manager is connected to the user interface and is connected between the dedicated architectures and a radio input/output of the terminal,
  each of the dedicated architectures is configured for communication with at least one of the communications networks,
  the dedicated architecture manager is configured to provide simultaneous connection to more than one of the communications networks, and
  the dedicated architecture manager connects via the PDP context link to each connected communications network to control a state of said link and to adapt at least one resource of the plurality of resources to the connected communications networks.

13. The method of claim 12, wherein the dedicated architecture manager comprises a first transmission unit to provide individual communication with each of the dedicated architectures.

14. The method of claim 12, wherein the dedicated architecture manager comprises a second transmission unit to provide communication with multiple communications networks.

15. The method of claim 12, wherein the dedicated architecture manager comprises a network interface to provide communication with multiple communications networks.

16. The method of claim 12, wherein the dedicated architecture manager controls access by the dedicated architectures to resources of the terminal.

17. The method of claim 12, wherein the selected connection management function is a creation function that initiates transmission between the selected communications network and the terminal.

18. The method of claim 17, wherein the creation function comprises:
  activating a PDP context link to the selected communications network;
  receiving, from the selected communications network, an address that identifies the terminal in the selected communications network; and
  sending the address to the dedicated architecture assigned to the selected communications network.

19. The method of claim 12, wherein the selected connection management function is a modification function that modifies characteristics of transmission between the selected communications network and the terminal.

20. The method of claim 12, wherein the selected connection management function is a suspension function that suspends transmission between the selected communications network and the terminal.

21. The method of claim 12, wherein the selected connection management function is a closure function that ends transmission between the selected communications network and the terminal.

22. The method of claim 21, wherein the closure function comprises:
  deactivating a PDP context link to the selected communications network; and
  releasing resources of the terminal accessed by the dedicated architecture assigned to the selected communications network.

23. The terminal of claim 12, wherein the user selection of one of the communications networks is based on a list of access point names stored by the dedicated architecture manager.

* * * * *